Oct. 24, 1967  E. B. HENBY  3,348,364
GAS SCRUBBER WITH IMPROVED LIQUID SEPARATOR
Filed Oct. 23, 1965  2 Sheets-Sheet 1
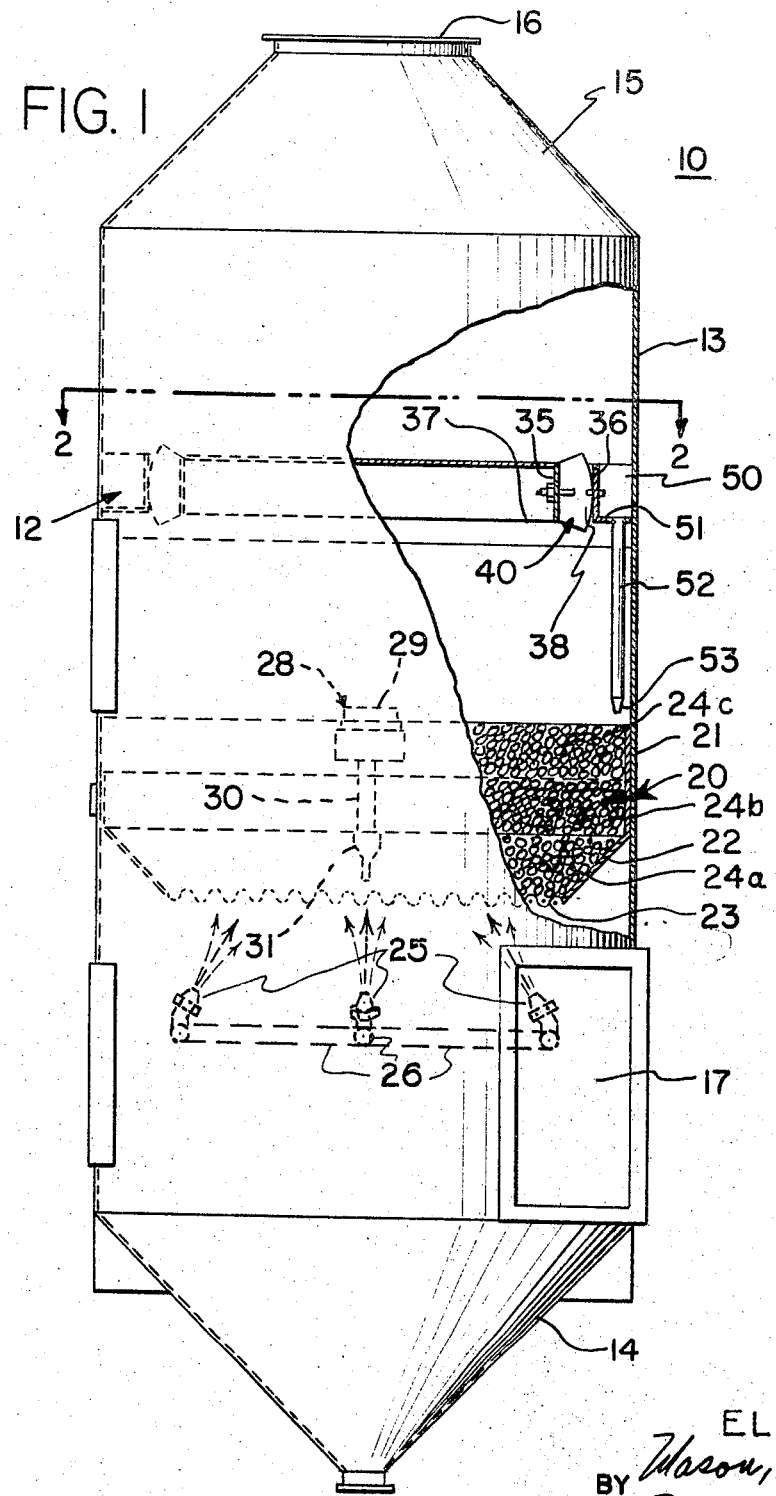
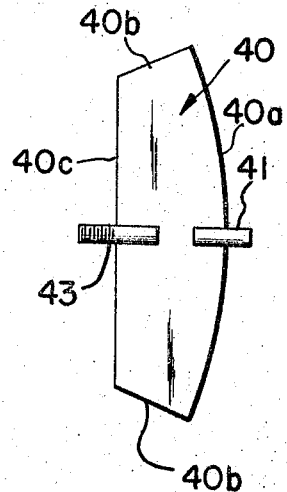
INVENTOR:
ELIJAH B. HENBY,
BY Mason, Kolehmainen,
Rathburn & Wyss.
ATTORNEYS Oct. 24, 1967  E. B. HENBY  3,348,364
GAS SCRUBBER WITH IMPROVED LIQUID SEPARATOR
Filed Oct. 23, 1965  2 Sheets-Sheet 2
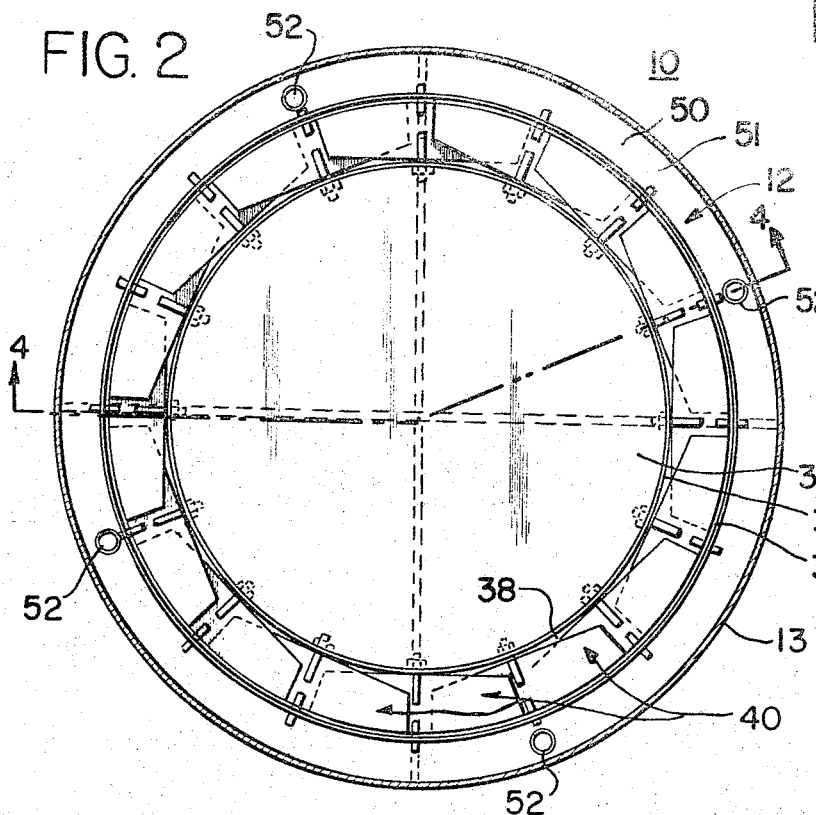
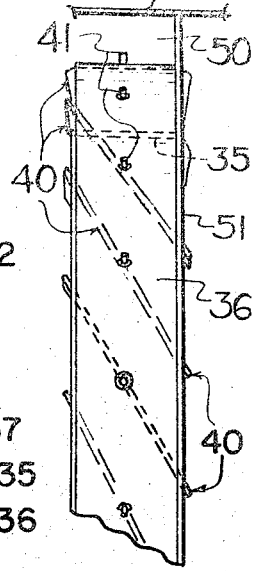
INVENTOR:
ELIJAH B. HENBY,
BY Mason, Kolehmainen,
Rathburn & Wyss.
ATTORNEYS United States Patent Office 3,348,364
Patented Oct. 24, 1967

3,348,364
GAS SCRUBBER WITH IMPROVED
LIQUID SEPARATOR
Elijah B. Henby, Northfield, Ill., assignor to National
Dust Collector Corporation, Skokie, Ill., a corporation
of Illinois
Filed Oct. 23, 1965, Ser. No. 503,463
1 Claim. (Cl. 55—257)

ABSTRACT OF THE DISCLOSURE

A wet type, updraft gas scrubber comprising a vertical cylindrical housing with inlet means adjacent the lower end and outlet means adjacent the upper end, a filter bed extending transversely across the housing intermediate the inlet and outlet comprising a plurality of spherical filter elements, liquid spray means for introducing fine liquid droplets into the gas flowing upwardly into the filter bed to wet and collect contaminants in the gas, separator means intermediate said filter bed and the outlet for removing and collecting any liquid or mist remaining in the gas flowing upwardly from said filter bed, said separator means including a pair of rings defining an annular flow path substantially smaller in cross section than the housing for accelerating the gas flow therethrough and a plurality of adjustable deflecting vanes mounted between said rings in said flow path for directing the high velocity, upwardly flowing gas outwardly with a horizontal component against the housing wall, an annular liquid collecting trough between the outer ring and said housing wall for collecting liquid centrifuged outwardly against the wall, and drain means for said trough directing the collected liquid onto said filter bed.

---

This invention relates to an entrainment separator and, more particularly, to an entrainment separator of the type adapted for use with a wet scrubber-type gas cleaner wherein contaminated gas is first brought in contact with scrubbing liquid to entrain the contaminated particles therein, and thereafter the gas and liquid mixture is passed through a separator to remove the entrained liquid from the gas.

Wet scrubber gas cleaners are well known, for example, as illustrated in prior U.S. Patent No. 2,691,423 and granted Oct. 12, 1954. Such a known wet scrubbing process involves bringing the contaminated gas into contact with liquid particles or droplets so that the contaminated particles in the gas collide with and are entrapped by the liquid droplets. The liquid-particle droplets are then separated from the gas by means of an entrainment separator. Entrainment separators are also known, for example, as illustrated in prior U.S. Patent No. 3,077,714 granted Feb. 19, 1963.

One type of entrainment separator provides a swirling motion to the liquid-particle-containing gas so that the liquid particles are slung outwardly by centrifugal force against an outer wall or surface where they are collected and conducted away. The efficiency of such an entrainment separator depends, among other things, upon the swirling velocity of the liquid-particle-contaminated gas. The swirling velocity of the contaminated gas in turn is a function of the quantity of gas which is passing through the gas cleaner. The entrainment separator will provide optimum mist separation of the liquid particles with a minimum pressure drop through the separator at an optimum design velocity for the contaminated gas. At greater or less flow rates the efficiency of the separator drops off. It is desirable that an entrainment separator be available which may be readily adaptable to various flow rates so that a minimum number of various sizes of such separators need be manufactured and stocked. Moreover, the adjustability of the separator to provide for maximum efficiency at various flow rates permits equipment to be installed or removed to the separator as the need arises.

It is therefore an object of the present invention to provide an improved entrainment separator for use in a gas cleaner and the like.

Another object of the present invention is to provide an improved entrainment separator which is adjustable for various flow rates to provide the optimum efficiency at a selected rate.

A further object of the present invention is to provide an improved gas cleaner having a new and improved entrainment separator.

Further objects and advantages of this invention will become apparent as the following description proceeds, and the features or novelty which characterize the invention will be pointed out with particularity in the claim annexed to and forming a part of this specification.

Briefly, according to the present invention, there is provided an improved entrainment separator for use in a wet scrubber-type gas cleaner and the like wherein the contaminated gas first passes through a liquid cleaner. The contaminated gas passing through the liquid cleaner picks up liquid droplets which entrap the contaminated particles in the gas. Such liquid-particle-containing gas leaves the wet scrubber in the form of a mist so that the entrainment separator must separate the liquid mist from the gas.

The entrainment separator, according to the present invention, passes the flow of liquid-particle-containing gas between inner and outer ringlike, concentrically spaced cylinders forming a passageway containing a plurality of angularly adjustable vanes. In a preferred embodiment of the invention, a baffle closes the inner cylinder. The entrainment separator is contained within a vertical housing conduit so that the contaminated gas passes upwardly between the inner and outer cylinders and is swirled at high velocity by the vanes. To collect the liquid particles which are slung outwardly against the wall of the housing conduit, the outer cylinder is spaced inwardly of the housing conduit and a bottom wall is provided between the outer cylinder and the housing conduit to define a trough for the collection of the moisture. Suitable means such as an elongated standpipe terminating in a drain sock is provided for conducting the collected moisture from the trough.

The nature of the invention will best be understood when described in connection with the accompanying drawings, in which:

FIG. 1 is a broken away elevational view of a wet scrubber-type gas cleaner utilizing an entrainment separator according to the present invention;

FIG. 2 is a cross-sectional view of the gas scrubber in FIG. 1 taken along line 2—2 of FIG. 1, and illustrating a plan view of improved entrainment separator;

FIG. 3 is a fragmentary elevational view of the entrainment separator of FIG. 1;

FIG. 4 is a cross-sectional view of the entrainment separator of FIG. 1, taken along line 4—4 of FIG. 2; and FIG. 5 is a detailed view of one of the adjustable vanes of the entrainment separator.

Referring now to the drawings, there is illustrated a wet scrubber-type hydrofilter or gas cleaner 10 having an entrainment separator or demisting assembly 12 according to the present invention. The gas cleaner 10 includes a vertical cylindrical housing 13 defining a conduit for the gas flow. The lower end of the housing 13 is closed by a bottom cone 14 forming a sump for the collection of liquid in the gas cleaner. The upper end of the housing 13 is closed by an outlet cone 15 terminating in a gas outlet 16. A gas inlet 17 is provided in the lower sidewall of the housing 13 and preferably directs the inflowing gas tangentially within the housing. The contaminated gas which enters the gas cleaner 16 through the gas inlet 17 passes vertically upwardly through a suitable filter or wet scrubbing assembly 20, which may be of a known type, such as illustrated in above-mentioned Patent No. 2,691,423. The gas leaves the wet scrubbing assembly 20 containing liquid-particle mist and flows through the entrainment separator where these liquid particles are separated out. After demisting, the gas leaves the gas cleaner 10 through the gas outlet 16 at the upper end of the housing 13. The wet scrubbing assembly 20 includes a filter casing 21 having a lower air distribution cone 22 across the path of gas flow within the housing 13. A suitable screen 23 is supported at the bottom of the air distribution cone, and the screen supports several layers or beds 24a, 24b, and 24c of filter elements. Each filter bed includes a plurality of filter elements comprising various sized spheroids constructed of noncorrosive material, such as glass or the like having relatively smooth external surfaces.

Liquid for cleaning the gas is introduced into the gas stream below the filter beds by a plurality of spray nozzles 25 connected to a liquid inlet pipe or manifold 26. The nozzles 25 direct a fine spray of liquid droplets into the gas stream, and the contaminants and dust within the gas are entrapped and collected in the liquid droplets. The spherical surfaces of the filter elements are wetted by the liquid from the spray nozzles, and the contaminated gas contacts these wetted surfaces as it moves upwardly through the filter bed. The dust particles and contaminants in the gas impinge on the wetted spheroids and are collected and entrapped by the liquid film. If desired, additional nozzles (not shown) may be provided above the filter beds to direct a spray of liquid downwardly onto the upper surface of the beds opposite to the direction of the gas stream.

To control the level of liquid which may build up above the wet scrubbing assembly 20, there is provided suitable overflow means 28 including a turbulent level control 29. A standpipe 30 extends from the level control 29 at least partially through the filter beds 24a, 24b and 24c and terminates in a suitable drain sock and clamp 31. The overflow means 28 is effective to drain off excessive liquid which may accumulate above the filter bed 24c.

As the contaminated gas leaves the wet scrubbing assembly 20, it carries minute liquid droplets in the form of liquid mist. This liquid mist is then directed by the housing 13 through the entrainment separator 12. According to the present invention, the entrainment separator 12 is effective to provide swirl to the gas, thereby to sling the liquid droplets outwardly where they collect against the inner surface of the housing 13.

Referring now to the entrainment separator, as best illustrated in FIGS. 2, 3, and 4, the entrainment separator includes inner and outer ringlike concentrically spaced cylinders 35 and 36 forming a gas passageway 38. A baffle 37 closes the upper end of the inner cylinder to define an inverted cup-shaped member. A plurality of angular adjustable vanes 40 are positioned in the passageway 38 between the cylinders 35 and 36.

To permit angular adjustability of the vanes 40, each vane 40, as best illustrated in FIG. 5, is formed in the shape of a planar truncated sector having an arcuate outer edge 40a, equal radial side edges 40b, and a straight inner edge 40c. A locating projection 41 extends beyond the arcuate edge into an aperture 42 in the outer cylinder 36. A threaded stud 43 is aligned with the projection 41 and extends inwardly beyond the straight inner edge 40c through a suitable aperture 44 in the inner cylinder 35. A plurality of nuts 46 threaded on respective ones of the studs 43 secures the respective vanes 40 within the passageway 38 in selected angular position.

To collect the liquid droplets which are centrifugally slung outwardly against the inner surface of the housing 13, there is provided a suitable trough 50 defined between the outer cylinder 36, the housing 13, and a bottom wall 51. Suitable standpipes 52, each terminating in a drain sock 53, conduct accumulated liquid from the trough 50. The drain sock may be similar to those described in above-mentioned Patent No. 3,077,714.

From the above description of the gas cleaner, the operation thereof is believed clear. However, briefly, it will be understood that contaminated gas entering the gas cleaner 10 through the gas inlet 17 is given an initial tangential swirl ad moved upwardly through the wet scrubber assembly 20, being discharged from the wet scrubber with liquid particles and droplets in the form of mist. The gas containing the liquid particles and droplets is then directed through the passageway 38 between the inner and outer cylinders 35 and 36 where it is swirled at high angular velocity by the vanes 40. Due to the swirling of the liquid-laden gas, the liquid is centrifugally slung outwardly against the inner wall of the housing 13 where it runs down the surface of the housing and is accumulated in the trough 50. The accumulation of the liquid in the trough 50 is effective periodically to open the drain sock 53 to discharge the accumulated liquid over the wet scrubbing assembly 20 where it will flow through the wet scrubbing assembly 20 and into the bottom cone 14 of the gas filter. The clean, dry gas can then be directed to the gas outlet 16. Advantageously, the vanes 40 may be angularly adjusted to provide the optimum swirl at the particular flow rate for maximum separating efficiency with a minimum pressure drop through the entrainment separator 12.

Although a single embodiment of the invention has been described by way of illustration, many modifications will occur to those skilled in the art. Moreover, the improved entrainment separator may be used for drying any liquid-containing gas. It is therefore intended in the appended claim to cover all such modifications as fall within the true spirit and scope of this invention.

What is claimed as new and desired to be secured by Letters Patent of the United States is:

A wet type, updraft gas scrubber comprising a housing having a vertically extending, cylindrical wall, inlet means to the housing adjacent the lower end of said housing, outlet means from the housing adjacent the upper end of said housing, a filter bed extending transversely across said housing intermediate said inlet and outlet means, said filter bed comprising a plurality of spherical filter elements forming a plurality of diverse and tortuous paths for said gas flowing upwardly therethrough, liquid spray means between said inlet means and said bed for upwardly introducing a fine spray of liquid droplets into the gas flowing upwardly into said filter bed thereby to wet and collect the contaminants in the gas on the surfaces of said filter elements, and separator means for removing and collecting liquid remaining in the gas flowing upwardly from said filter bed, said separator means including a pair of co-axial, spaced apart, inner and outer cylindrical rings defining therebetween an annular flow path for said gas substantially smaller in cross section than said housing and thereby substantially increasing the flow velocity of said gas, said inner and outer rings being arranged co-axially with the vertical axis of said cylindrical wall and spaced intermediate said filter bed and the upper end of said wall, said outer ring having a diameter less than the internal diameter of said cylindrical wall and spaced inwardly therefrom for forming an inner wall of a annular, liquid collecting trough around the interior surface of said cylindrical wall, an annular bottom wall for said trough extending between said outer ring and said cylindrical wall, means in said bottom wall for removing the collected liquid from said trough and directing said liquid into said filter bed, imperforate circular wall means across said inner ring for blocking gas flow upwardly to said inner ring, and a plurality of adjustable spaced inclined overlapping planar swirl vanes mounted between said rings throughout said annular gas flow path for directing the upwardly flowing gas between said rings outwardly at high velocity against the cylindrical wall of said housing, each of said vanes including an arcuate outer edge adjacent said outer ring, and a straight inner edge and a pair of mounting pins connected at the inner and outer edges of the vanes projecting through said inner and outer rings, respectively, pivotally supporting said vanes for angular adjustment relative to the horizontal and overflow means effective to drain off excessive liquid which may accumulate above the filter bed.

References Cited

UNITED STATES PATENTS

| | | | |
|---|---|---|---|
| 2,226,127 | 12/1940 | Harmon | 55—237 |
| 2,393,112 | 1/1946 | Lincoln | 55—457 |
| 2,409,088 | 10/1946 | Weits et al. | 55—238 |
| 2,562,007 | 7/1951 | Whittaker | 55—393 |
| 2,575,359 | 11/1951 | Ortgies | 55—236 |
| 2,691,423 | 10/1954 | McIlvaine | 55—233 |
| 3,077,714 | 2/1963 | McIlvaine | 55—238 |
| 3,128,320 | 4/1964 | Umbricht | 55—459 |
| 3,251,176 | 5/1966 | Gleason | 55—457 |
| 3,289,398 | 12/1966 | McIlvaine | 55—440 |

FOREIGN PATENTS

| | | |
|---|---|---|
| 849,214 | 9/1960 | Great Britain. |

HARRY B. THORNTON, *Primary Examiner.*

B. NOZICK, *Assistant Examiner.*